US011781899B2

(12) United States Patent
Reber et al.

(10) Patent No.: US 11,781,899 B2
(45) Date of Patent: Oct. 10, 2023

(54) METHOD FOR THE VERIFICATION OF PIPETTES

(71) Applicant: Mettler-Toledo GmbH, Greifensee (CH)

(72) Inventors: Daniel Reber, Madetswil (CH); Christoph Lang, Schwerzenbach (CH)

(73) Assignee: Mettler-Toledo GmbH, Greifensee (CH)

(*) Notice: Subject to any disclaimer, the term of this patent is extended or adjusted under 35 U.S.C. 154(b) by 704 days.

(21) Appl. No.: 16/814,523

(22) Filed: Mar. 10, 2020

(65) Prior Publication Data
US 2020/0292374 A1 Sep. 17, 2020

(30) Foreign Application Priority Data

Mar. 11, 2019 (EP) .................................. 19161917

(51) Int. Cl.
G01G 17/04 (2006.01)
B01L 3/02 (2006.01)
G01G 23/01 (2006.01)

(52) U.S. Cl.
CPC .............. *G01G 17/04* (2013.01); *B01L 3/021* (2013.01); *G01G 23/01* (2013.01); *B01L 2200/148* (2013.01)

(58) Field of Classification Search
CPC ......... G01G 17/04; G01G 23/01; B01L 3/021
(Continued)

(56) References Cited

U.S. PATENT DOCUMENTS 5,061,639 A * 10/1991 Lung ................ G01N 35/00594
356/627
7,829,800 B2 11/2010 Thiel et al.
(Continued)

FOREIGN PATENT DOCUMENTS

CN 212379235 U * 1/2021
JP 2002202173 A * 7/2002
(Continued)

OTHER PUBLICATIONS

Translation JP-2002202173 (Year: 2002).*
(Continued)

*Primary Examiner* — Peter J Macchiarolo
*Assistant Examiner* — Monica S Young
(74) *Attorney, Agent, or Firm* — STANDLEY LAW GROUP LLP; Jeffrey S. Standley; Adam J. Smith

(57) ABSTRACT

A verification of a pipette results in a release or a warning message. A liquid measuring container (110) receives the pipette liquid volume ($V_P$) to be verified. A loading cell (120) is connected to the liquid measuring container in a force-transmitting manner. The loading cell outputs a measurement signal (ms) corresponding to the weight force ($F_G$) acting thereon. A processing unit (130) detects and processes the measurement signal (ms), determines a first weight force ($G_{t1}$) at time point ($t_1$) and determines a second weight force ($G_{t2}$) at time point ($t_2$). The pipette liquid volume is calculated and the calculated value is assigned to a pipette volume class ($K_i$) having a defined class nominal value ($VK_i$). The processing unit tests whether or not an absolute value of the volume difference ($\Delta V$) is within a predetermined tolerance value (T) for the assigned pipette volume class. The processing unit outputs the test result.

15 Claims, 2 Drawing Sheets

(58) Field of Classification Search
USPC ............................................. 73/861.04; 177/1
See application file for complete search history.

(56) References Cited

U.S. PATENT DOCUMENTS

| | | | |
|---|---|---|---|
| 10,197,435 B2 | 2/2019 | Graf et al. | |
| 10,281,319 B2 | 5/2019 | Baumfalk et al. | |
| 10,393,570 B2 | 8/2019 | Esser et al. | |
| 2004/0171171 A1* | 9/2004 | Appoldt | G01G 17/04 422/534 |
| 2005/0129255 A1* | 6/2005 | Yoshino | H04S 7/301 381/59 |
| 2008/0257039 A1* | 10/2008 | Thiel | G01G 21/30 73/382 R |
| 2016/0252388 A1* | 9/2016 | Esser | G01G 23/01 177/1 |
| 2017/0023400 A1 | 1/2017 | Rindermann et al. | |
| 2017/0124264 A1* | 5/2017 | Jordan | G06K 19/07758 |
| 2018/0100757 A1* | 4/2018 | Tiemens | G01G 17/04 |
| 2018/0225887 A1* | 8/2018 | Keller | G06F 16/2477 |
| 2019/0137325 A1 | 5/2019 | Esser et al. | |
| 2022/0097037 A1* | 3/2022 | Shahar | G01N 35/0099 |

FOREIGN PATENT DOCUMENTS

| | | | | |
|---|---|---|---|---|
| JP | 2010078600 A | * | 4/2010 | ............ G01G 17/06 |
| JP | 2010266349 A | * | 11/2010 | |
| RU | 2353426 C2 | * | 4/2009 | ............... B01L 3/02 |
| RU | 2762936 C2 | * | 12/2021 | ............ C12M 41/46 |

OTHER PUBLICATIONS

A&D Company, Limited, Pipette Accuracy Tester PT-Series AD-4212B-PT AD-4212A-PT FX-300i-PT Instruction manual, available online at https://www.aandd.jp/products/manual/test_measuring/pipette.pdf, 2015, 36 pages.

Gilson, Inc., Gilson guide to pipetting, Second Edition, 2005, 57 pages.

* cited by examiner

METHOD FOR THE VERIFICATION OF PIPETTES

CROSS-REFERENCE TO RELATED APPLICATIONS

This application claims the benefit of priority to European patent application 19161917.0, filed on 11 Mar. 2019, which is incorporated by reference as if fully recited herein.

TECHNICAL FIELD

The invention relates to a method for the verification of pipettes and to a device for the verification of pipettes. It is known that temperature, air pressure and humidity affect a balance itself. For this reason, in order to compensate for changes in the weighing value with changed environmental parameters, correction factors are stored in the device, for example in the form of curves or tables. For this purpose, in the environment of a loading cell, e.g., in the laboratory, temperature and air humidity sensors are arranged, by which then a correction of the balance itself takes place automatically depending on the changing environmental conditions. The evaporation of water during a measurement process is a frequently mentioned problem. As an indication of the magnitude of this effect, it can be shown based on the following example: A container with an opening of 40 mm diameter at 20° C. has an approximate evaporation rate of approx. 20 μg/s.

BACKGROUND OF THE ART

From EP 1 975 577 A1, a balance for the gravimetric calibration of pipettes is known, which has a windbreak and built-in temperature, air pressure and air humidity sensors.

In EP 3 066 430 B1, a method for calibrating a pipette with the aid of a balance is disclosed, in which during the calibration process, an evaporation rate is determined, and the measurement is corrected by the determined evaporation rate. Here, the evaporation rate is corrected by means of data which is recorded during the calibration process by a climate module which contains an air pressure sensor, an air humidity sensor and an air temperature sensor. In this way, the accuracy of measurement or the accuracy of the calibration process is increased because the calibration process does not have to be based on an assumed predefined evaporation rate, but on a realistic value which depends on the current climatic conditions during the calibration process.

In contrast to a method for calibrating a pipette, the method for the verification of a pipette is rather to be regarded as a proof of performance of a pipette. Based on a weight measurement, it is defined whether the volume to be tested is within a predefined range and a tolerance or not. From this, it can be regarded that the result is not a nominal value, but a status. A calibration is a time-consuming and costly process, which entails a precise documentation. In the interval between two calibrations, the user is uncertain whether the pipette volume will still meet the calibration standards or not. Failure to meet the calibration standards may put an entire series of measurements into question or have a critical impact on the user's business.

The aim of a pipette verification (pipette performance verification) is to give the user or handler immediate feedback—including a documented confirmation—that the pipette is still sufficiently accurate and ready for use. Expediently, it means that the feedback gives a statement as to whether the actual process accuracy of the pipetting is within the limit of a defined tolerance or not, which depends on the error of the pipetting instrument and possible influences of the user, the fluid and the environment.

Therefore, it is the object of the present invention to provide a user with a simplified and fast method, which requires minimal manual intervention and has a robust performance.

SUMMARY OF THE INVENTION

This object is achieved by a method that has the features specified in the independent claims. Advantageous embodiments of the invention are specified in the further dependent claims.

The object is achieved by a method for the verification of pipettes, in which the result of the verification is a release or a warning message, comprising the following steps: providing a liquid measuring container for receiving the pipette liquid volume to be verified, a loading cell connected in a force-transmitting manner to the liquid measuring container, which outputs a measurement signal corresponding to the weight force acting on the loading cell, and a processing unit for detecting and processing the measurement signal of the loading cell; determining a first weight force from the stable measurement signal at the time point $t_1$ of a last stable measurement point by the processing unit, in which said last stable measurement point is chronologically prior to the receiving of the pipette liquid volume to be verified; determining a second weight force from the stable measurement signal at the time point $t_2$ of a new stable measurement point by the processing unit, in which said new stable measurement point is chronologically after receiving the pipette liquid volume to be verified; calculating the pipette liquid volume by the processing unit according to the formula: $V_P = \rho^{-1} \times (G_{t2} - G_{t1})$; assigning the calculated pipette liquid volume to one of at least one pipette volume class having a defined class nominal value, in which the assignment by the processing unit takes place in such a way that the absolute value of a volume difference between the pipette liquid volume and the class nominal value is as small as possible; testing by the processing unit whether or not the absolute value of the volume difference is within a tolerance value for the class nominal value of the assigned pipette volume class; and outputting the test result by the processing unit as a release when the volume difference is within the tolerance value, or as a warning message when the volume difference is outside the tolerance value.

The method is advantageous for the user in that the calibration interval does not have to be defined by empirically determined data but can be tailored specifically to the requirements of the user. Thus, a necessary calibration of a pipette can be recognized when this is necessary in accordance with the impact of pipetting on the user's business and the pipetting process tolerance. For the user, this can lead to a prolonged calibration interval and thus to cost savings due to (properly) deferred calibrations. In the case of a shortened calibration interval, this leads to a quality improvement of the pipetting process, which, depending on the user's business, reduces or prevents material losses, results that are not true to specifications, time losses, reworking, product recalls or reputational damage. However, the calibration interval may also remain unchanged, whereby a defective pipette would be detected in time in order to be led to an earlier calibration. Undetected defective pipettes can put entire series of measurements in question, because e.g., it is often not apparent when a pipette is not working properly any more due to dropping.

The test by the processing unit (130) can be made based on a predefined number of times the pipette liquid volume ($V_P$) to be verified is received into the liquid measuring container. This means that the pipette liquid volume ($V_P$) to be verified is received multiple times in succession, in each case after signalling to the operator, and the testing takes place based on the multiple existing calculations of the pipette liquid volume. So to speak, a statistical multiple measurement is carried out.

When introducing the pipette liquid volume to be verified, care should be taken to ensure that it is introduced all at once from the pipette into the liquid measuring container, or at least dropwise, so that the measurement signal of the loading cell is indicated as stable by the processing unit only after the complete emptying of the pipette.

A signal is considered as a stable measurement signal, which is within a signal band with a defined time length and signal level. This means that from the time point of a measurement signal value, all measurement signal values, preceding over a certain time period, may deviate at most by a defined difference.

Advantageously, the method proceeds fully automatically, in which the receiving of the pipette liquid volume to be verified into the liquid measuring container triggers the verification by the processing unit, and in which after the output of the test result, the processing unit is ready to receive and verify the next pipette liquid volume to be verified. The method displays the test result without additional user interaction and, after displaying the result, switches into readiness to carry out additional verifications.

Further, the method may comprise the following steps: determining an evaporation rate of the liquid in the liquid measuring container by processing the measurement signal over a preceding time period which terminates at the latest at time point $t_1$; calculating the evaporation volume between time point $t_1$ and time point $t_2$; and calculating the pipette liquid volume according to the formula:

$$V_P = \rho^{-1} \times (G_{t2} - G_{t1} + c_v \times (t_2 - t_1)).$$

Advantageously, the time period is at least and inclusive of ten seconds, and/or at most and inclusive of ten times the time difference between time point $t_1$ and time point $t_2$. It is further advantageous to check the validity of the evaporation rate based on a reference value.

In a further development of the method, the method is ended without an output of a result, when the weight force difference is less than a predetermined value, or is ended with an output of a warning message, when the weight force acting on the loading cell is greater than a predetermined value, or when the measurement signal has not reached a stable state within a defined time period.

A development of the method is characterized in that the output of the test result takes place in the form of a visual, acoustic and/or electrical signal. Advantageously, the test result is output as a visual signal by means of a multicolour LED for each pipette volume class. Further, after the output of the test result and a defined output time period of the visual signal, all LEDs can signal the verification as ended and readiness for another or a new verification by simultaneous flashing.

In a further development of the method, this further comprises the following steps: providing an identification sensor for identifying a pipette, and a database system for storing the test results of a verification; detecting an identification feature of the pipette, with which the pipette can be uniquely and unmistakably identified; storing the test result of the verification of the pipette in the database system.

The inventive method as described above can be performed by a device, said device comprising a liquid measuring container for receiving a pipette liquid volume to be verified, a loading cell connected to the liquid measuring container in a force-transmitting manner, which outputs a measurement signal corresponding to the weight force acting on the loading cell, and a processing unit being used for detecting and processing the measurement signal of the loading cell in order to perform the method. Advantageously, the opening of the provided liquid measuring container has a minimum opening cross section of and including 100 mm$^2$.

BRIEF DESCRIPTION OF THE DRAWINGS

Details of the force measuring device according to the invention, the force measuring module according to the invention, and the method according to the invention are given based on the description of the embodiment examples shown in the drawings. Shown are.

Features with the same function and similar configuration are provided with the same reference numbers in the following description.

DETAILED DESCRIPTION OF THE EMBODIMENTS

Figure 1:
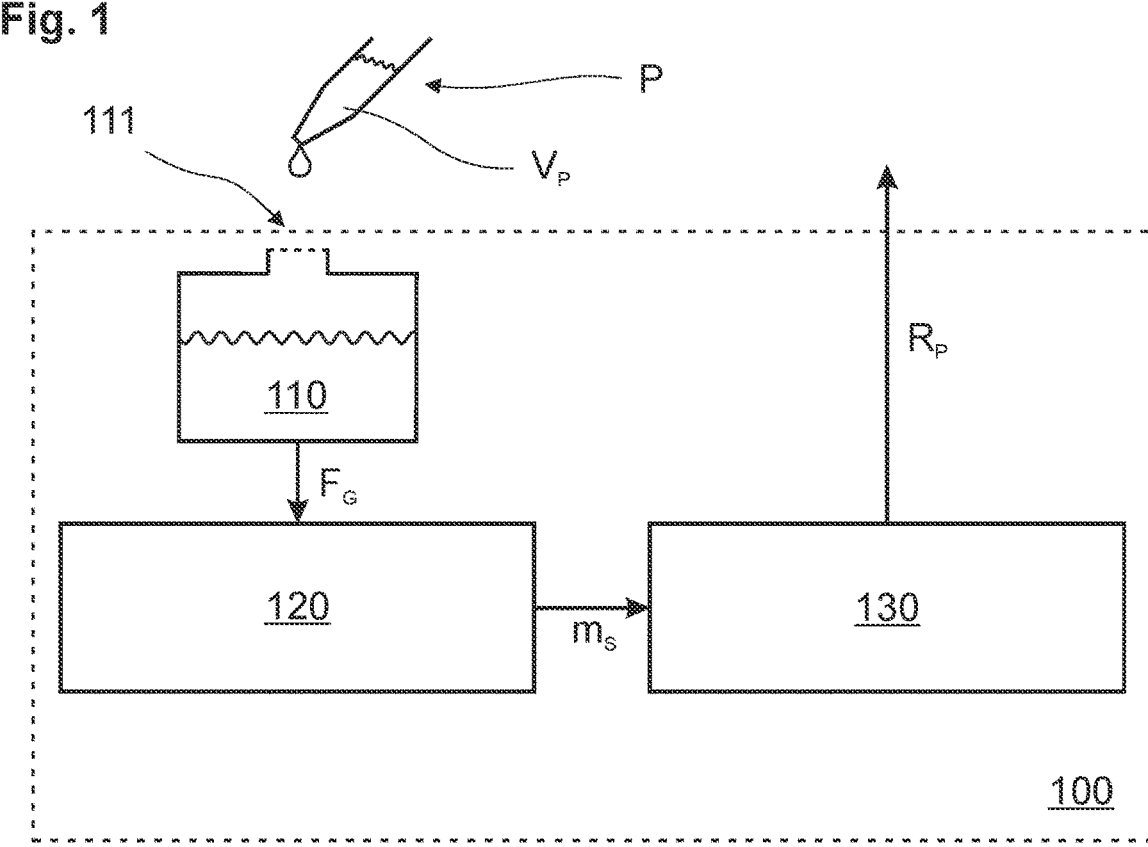
FIG. 1 a schematic structure of an embodiment of the inventive device.
Figure 3:
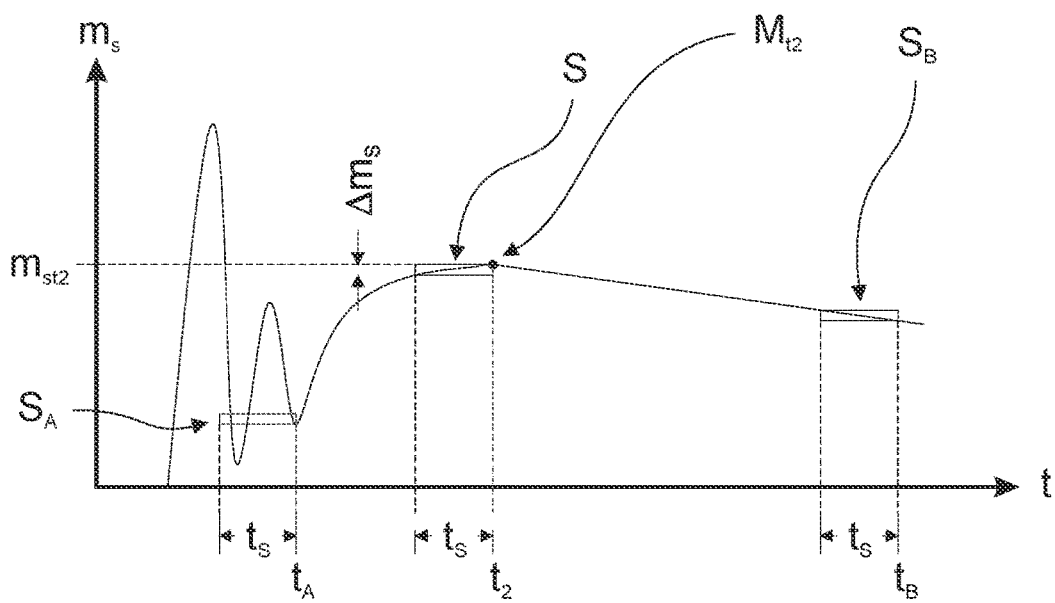
FIG. 3 determination of a stable measurement signal by the processing unit.

FIG. 1 schematically shows the device 100 for the verification of pipettes. The device 100 shown here consists of a liquid measuring container 110, a loading cell 120, and a processing unit 130. The liquid measuring container 110 has an opening 111, through which the pipette liquid volume $V_P$ to be verified can be introduced by the pipette P. Care must be taken here to ensure that the pipette liquid volume $V_P$ to be verified is introduced all at once from the pipette P into the liquid measuring container 110, or at least dropwise, so that the measurement signal ms of the loading cell 120 is indicated as stable by the processing unit 130 only after the complete emptying of the pipette P (see description relating to FIG. 3). The liquid measuring container 110 is connected to the loading cell 120 in a force-transmitting manner, so that it exerts a weight force $F_G$ acting on the loading cell 120, which is continuously output to a processing unit 130 as a measurement signal $m_S$. The processing unit 130 is used for detecting and processing the measurement signal $m_S$ of the loading cell 120 and for performing the method. The test result ($R_P$) is output in the form of a visual, acoustic and/or electrical signal.

The introduced pipette liquid remains in the liquid measuring container 110, which is filled more and more by each further verification. When the weight force $F_G$ of the liquid measuring container 110 acting on the loading cell 120 reaches an upper limit, this is recognized by the processing unit 130 based on the measurement signal ms and signalled to the user. Until the upper limit is reached, the method runs uninterruptedly, that is, the processing unit 130 assesses the measurement signal ms of the loading cell 120 without interruption. Thus, the user only introduces the pipette liquid volume $V_P$ into the liquid measuring container 110, whereby the measurement signal $m_S$ of the loading cell 120 is triggered. This triggering starts the verification method as described below with reference to FIG. 2.

Figure 2:
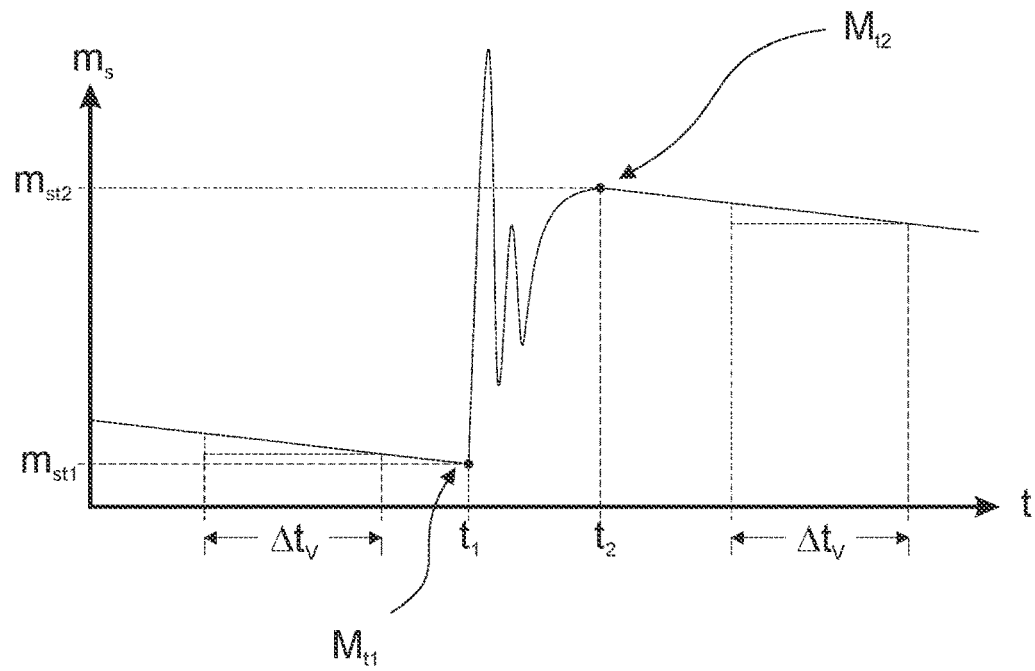
FIG. 2 a measurement signal course when receiving the pipette liquid volume to be verified.

Based on the measurement signal course from FIG. 2, the inventive method will now be described in more detail. The measurement signal course is shown before and after the receiving of the pipette liquid volume to be verified, which is recognized by the fact that the measurement signal between time point $t_1$ and time point $t_2$ is unsteady or that it is triggered.

The process is started by the user introducing the pipette liquid volume $V_P$ to be verified into the liquid measuring container 110. The triggering of the measurement signal now starts the measurement signal assessment. From the stable measurement signal ms at the time point $t_1$ of a last stable measurement point $M_{t1}$, a first weight force $G_{t1}$ is determined by the processing unit. This weight force corresponds to the amount of liquid already present in the liquid measuring container 110. From the stable measurement signal ms at the time point $t_2$ of a new stable measurement point $M_{t2}$, a second weight force $G_{t2}$ is determined by the processing unit 130. This weight force corresponds to the sum of the liquid amount already present in the liquid measuring container 110 plus the introduced pipette liquid volume $V_P$ to be verified. The pipette liquid volume $V_P$ can now be calculated according to the formula $V_P = \rho^{-1} \times (G_{t2} - G_{t1})$.

The calculated pipette liquid volume $V_P$ is assigned to a pipette volume class $K_i$ having a defined class nominal value $V_{Ki}$. The device may be pre-set to a few volumes, e.g., 20 µl, 100 µl, 200 µl and 1000 µl, each with its own tolerance. The assignment takes place in such a way that the absolute value of a volume difference $\Delta V$ between the pipette liquid volume $V_P$ and the class nominal value $V_{Ki}$ is as small as possible. Now it can be checked whether or not the absolute value of the volume difference $\Delta V$ is within a tolerance value T for the class nominal value $V_{Ki}$ of the assigned pipette volume class $K_i$. When the volume difference $\Delta V$ is within the tolerance value T, a release takes place as an output of the test result, otherwise a warning message takes place when the volume difference $\Delta V$ is outside the tolerance value T.

A measurement signal ms is indicated as stable by the processing unit 130 (see FIG. 3) when it is within a signal band S having a time-defined length ts and having a maximum signal difference or signal level $\Delta m_S$. This means that from the time point of a measurement signal value, all measurement signal values, preceding over a certain time, may deviate at most by a defined difference. The definition of these parameters significantly affects how fast the processing unit 130 determines a stable measurement point $M_{ti}$. Here, it should be considered that the user should introduce the pipette liquid volume $V_P$ to be verified into the liquid container 110 without interruption as much as possible. Also, in the case of an accidental interruption, the processing unit 130 should not output the measurement signal ms as stable too early (by the parameter selection). The measurement signal ms at time point to is not indicated as stable, because said signal has not always been within the signal band $S_A$ over the preceding time period ts. On the contrary, it differs at time point ts and at time point $t_2$, at which the measurement signal $m_S$ is indicated as stable.

Furthermore, the method can further determine an evaporation rate $c_v$ of the liquid present in the liquid measuring container 110 by processing the measurement signal $m_S$, by detecting the weight loss over a preceding time period $\Delta tv$ which terminates at the latest at time point $t_1$. With this evaporation rate $c_v$, the evaporation volume $V_v$ between time point $t_1$ and time point $t_2$ can now be determined. Taking these values into account, the pipette liquid volume $V_P$ can be calculated more accurately according to the formula: $V_P = \rho_{-1} \times (G_{t2} - G_{t1} + c_v \times (t_2 - t_1))$.

The determination of the evaporation rate cv always takes place by means of a stable measurement signal after time point $t_2$ and before time point $t_1$, in which the duration over a time period $\Delta tv$ is at least and inclusive of ten seconds, and/or at most and inclusive of ten times the time difference between time point $t_1$ and time point $t_2$. In the time period $\Delta tv$, the determination of the evaporation rate $c_v$ can also be carried out continuously. Based on a reference value, the validity of the evaporation rate $c_v$ can be checked.

Now it can happen that the weight force difference $\Delta G_t$ is smaller than a predetermined value. In this case, the method is ended without an output of a result. Also, a weight force $F_G$ acting on the loading cell 120 may be greater than a predetermined value, in which case the method is ended with an output of a warning message. If these parameters are defined too narrowly for the determination of a stable measurement point $M_{ti}$, there is the possibility that the measurement signal ms cannot assume a stable state for the processing unit 130 within a defined time period. The method is then ended with an output of a warning message.

Each of the predefined volumes may be displayed by three LEDs, e.g., green, orange and red. When a new result is output, the corresponding LED is switched to a steady light for a certain time period. After the expiration of this time period, the LED is switched to a flashing mode, which further signals the result to the user, but also displays readiness for the next test. When the liquid measuring container 110 is full, the result is displayed as described above, but in addition all other LEDs flash, for example in red, with a short-on long-off pattern.

The method is fully automated and only the operation of the pipette by the user is required. The device 100 recognizes the process and displays the result without any additional user interaction.

Figure 4:
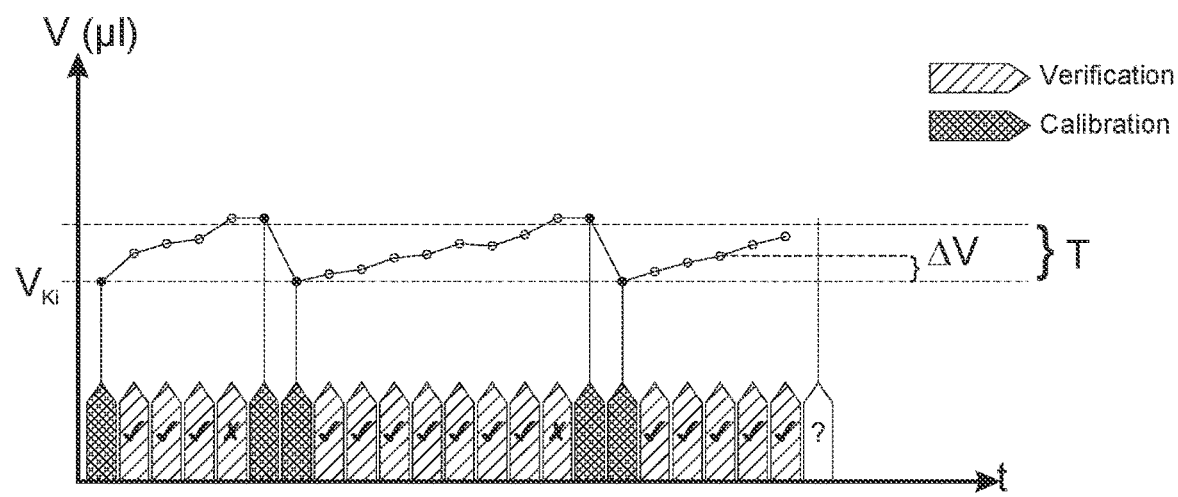
FIG. 4 a diagram of the calibration- and verification interval of a pipette.

In FIG. 4, the calibration and verification interval of a pipette is shown. A pipette is calibrated at the factory before it is delivered to the user. Between two regular calibrations of a pipette, verifications—also called quick tests—are carried out according to the inventive method. The frequency of these quick tests is recommended to the user through a risk assessment which is based on two specific criteria: A) the impact of pipetting on the user's business and B) the pipetting/pipetting process tolerance. From this, it can be deduced at which time interval a pipette must be subjected to a calibration, and what tolerance is to be maintained during the pipetting process.

Between the calibrations of a pipette, the inventive method is now used to give the user an immediate feedback that the pipette is still sufficiently accurate and ready for use. If the feedback is negative, the pipette can be subjected to a calibration already before the expiration of the calibration interval. Such early detection can prevent critical impact on the user's business.

Depending on the user's business, it may also be considered to extend the calibration interval in order to reduce the cost of a more expensive calibration and in order to reduce the time when the pipette is not available.

What is claimed is:

1. A method for verifying pipettes, wherein the result of the verification is a release or a warning message, the method comprising the steps of:

providing a liquid measuring container to receive a pipette liquid volume to be verified, a loading cell, connected to the liquid measuring container in a force-transmitting manner, the loading cell configured to output a measurement signal corresponding to a weight force acting on the loading cell, and a processing unit for receiving and processing the measurement signal;

determining a first weight force from the measurement signal at a first time point $t_1$ of a last stable measurement point by the processing unit, wherein said last measurement point is chronologically prior to the receiving of the pipette liquid volume to be verified;

determining a second weight force from the measurement signal at a second time point $t_2$ of a new measurement point by the processing unit, wherein said new measurement point is chronologically after the receiving of the pipette liquid volume to be verified;

calculating the pipette liquid volume in the processing unit according to the formula:

$$V_P = \rho^{-1} \times (G_{t2} - G_{t1});$$

wherein:
$V_P$ is the pipette liquid volume;
$\rho$ is the density of the pipette liquid;
$G_{t1}$ is the weight force at the first time point; and
$G_{t2}$ is the weight force at the second time point;

assigning the calculated pipette liquid volume to one of at least two pipette volume classes having a defined class nominal value respectively, wherein the assignment by the processing unit takes place in such a way that an absolute value of a volume difference between the pipette liquid volume and the class nominal value is as small as possible;

testing, in the processing unit, whether or not the volume difference has an absolute value that is less than a predetermined tolerance value for the class nominal value of the assigned pipette volume class; and outputting a test result from the processing unit as a release when the volume difference is less than the predetermined tolerance value, or as a warning message when the volume difference is greater than the predetermined tolerance value.

2. The method of claim 1, wherein:
the test is carried out by the processing unit based on a predefined number of times the pipette liquid volume to be verified is received.

3. The method of claim 1, wherein a measurement signal is a measurement signal when the measurement signal is within a signal band having a predetermined time length and predetermined signal level.

4. The method of claim 1, wherein the method is fully automated, such that the receiving of the pipette liquid volume to be verified into the liquid measuring container triggers the verification by the processing unit, and after outputting the test result, the processing unit is ready to receive and verify a next pipette liquid volume to be verified.

5. The method of claim 1, further comprising the steps of:
determining an evaporation rate of the liquid in the liquid measuring container by processing the measurement signal over a preceding time period which terminates at the latest at time point;
calculating the evaporation volume between time point ti and time point t2; and
calculating the pipette liquid volume according to the formula:

$$V_P = \rho^{-1} \times (G_{t2} - G_{t1} + c_v \times (t_2 - t_1))$$

wherein:
$c_v$ is the evaporation rate;
$t_1$ is the first time point; and
$t_2$ is the second time point.

6. The method of claim 5, wherein the time period ($\Delta tv$) is at least and inclusive of ten seconds, and at most and inclusive of ten times the time difference between time point $t_1$ and time point $t_2$.

7. The method of claim 5, wherein:
based on a reference value, the validity of the evaporation rate is checked.

8. The method of claim 1, wherein:
when the weight force difference is less than a predetermined value, the method is ended without a result output.

9. The method of claim 1, wherein:
when the weight force acting on the loading cell is greater than a predetermined value, the method is ended with an output of a warning message.

10. The method of claim 1, wherein:
if the measurement signal has not reached a stable state within a defined time period, the method is ended with an output of a warning message.

11. The method of claim 1, wherein:
the test result is output in the form of a visual, acoustic and/or electrical signal.

12. The method of claim 1, wherein:
the test result is output as a visual signal by means of a multicolour LED for each pipette volume class.

13. The method of claim 12, wherein:
after the output of the test result and after a defined output time period of the visual signal, all LEDs flash simultaneously to signal the verification as ended and readiness for another verification.

14. The method of claim 1, further comprising the steps of:
providing an identification sensor for identifying a pipette, and a database system for storing the test results of a verification;
detecting an identification feature of the pipette, with which a pipette can be uniquely identified; and
storing the test result of the verification of the pipette in the database system.

15. A device for the verification of pipettes, comprising
a liquid measuring container for receiving a pipette liquid volume to be verified,
a loading cell connected to the liquid measuring container in a force-transmitting manner, which outputs a measurement signal corresponding to the weight force acting on the loading cell, and
a processing unit for detecting and processing the measurement signal of the loading cell, wherein the processing unit comprises software instructions, which when executed, configure one or more processors of the processing unit to:
determine a first weight force from the measurement signal at a first time point $t_1$ of a last stable measurement point by the processing unit, wherein said last measurement point is chronologically prior to the receiving of the pipette liquid volume to be verified;
determine a second weight force from the measurement signal at a second time point $t_2$ of a new measurement point by the processing unit, wherein said new measurement point is chronologically after the receiving of the pipette liquid volume to be verified;
calculate the pipette liquid volume in the processing unit according to the formula:

$$V_P = \rho^{-1} \times (G_{t2} - G_{t1});$$

wherein:
- $V_P$ is the pipette liquid volume;
- $\rho$ is the density of the pipette liquid;
- $G_{t1}$ is the weight force at the first time point; and
- $G_{t2}$ is the weight force at the second time point;

assign the calculated pipette liquid volume to one of at least two pipette volume classes having a defined class nominal value respectively, wherein the assignment by the processing unit takes place in such a way that an absolute value of a volume difference between the pipette liquid volume and the class nominal value is as small as possible;

test, in the processing unit, whether or not the volume difference has an absolute value that is less than a predetermined tolerance value for the class nominal value of the assigned pipette volume class; and output a test result from the processing unit as a release when the volume difference is less than the predetermined tolerance value, or as a warning message when the volume difference is greater than the predetermined tolerance value.

* * * * *